(12) United States Patent
Purnadi et al.

(10) Patent No.: US 6,556,824 B1
(45) Date of Patent: *Apr. 29, 2003

(54) APPARATUS, AND ASSOCIATED METHOD FOR CONTROLLING SERVICE DEGRADATION PERFORMANCE OF COMMUNICATION IN A RADIO COMMUNICATION SYSTEM

(75) Inventors: Rene W. Purnadi, Coppell, TX (US); Liangchi Hsu, Arlington, TX (US); Yichyun Tseng, Plano, TX (US)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/429,759

(22) Filed: Oct. 28, 1999

Related U.S. Application Data (63) Continuation-in-part of application No. 09/116,530, filed on Jul. 16, 1998.
(51) Int. Cl.[7] .................................................. H04Q 7/20
(52) U.S. Cl. ........................ 455/422; 455/422; 455/432; 455/434
(58) Field of Search ................................ 455/422, 432, 455/434, 452, 512

(56) References Cited

U.S. PATENT DOCUMENTS

| | | | | |
|---|---|---|---|---|
| 5,363,427 A | * | 11/1994 | Ekstrom et al. | 379/58 |
| 5,371,780 A | * | 12/1994 | Amitay | 379/58 |
| 5,509,050 A | * | 4/1996 | Berland | 379/58 |
| 5,570,411 A | * | 10/1996 | Sicher | 379/57 |
| 5,592,154 A | * | 1/1997 | Lin et al. | 340/825.5 |
| 5,615,249 A | * | 3/1997 | Solondz | 379/58 |
| 5,729,542 A | * | 3/1998 | Dupont | 370/346 |
| 5,740,533 A | * | 4/1998 | Lin | 455/432 |
| 5,745,480 A | * | 4/1998 | Behtash et al. | 370/252 |
| 5,752,193 A | * | 5/1998 | Scholefield et al. | 455/452 |
| 6,055,571 A | * | 4/2000 | Fulp et al. | 709/224 |
| 6,201,971 B1 | * | 3/2001 | Purnadi et al. | 455/450 |
| 6,345,038 B1 | * | 2/2002 | Selinger | 370/230 |

* cited by examiner

Primary Examiner—Thanh Cong Le
Assistant Examiner—Stephen D'Agosta
(74) Attorney, Agent, or Firm—Federico Fracarroli (57) ABSTRACT

Apparatus, and an associated method, facilitates service degradation in a radio communication system, such as a cellular communication system. A service degradation profile is created, associated with a particular communication service-type, and includes values of QoS (quality of service) level values. If communication at levels corresponding to the values of the desired QoS level parameters is unavailable, efforts are made to effectuate, or maintain communication at quality levels corresponding to values of at least first QoS level parameters values. Service degradation thereby occurs pursuant to a selected profile, reducing the need for service renegotiations and reducing the possibility that an abrupt termination of a communication session might occur.

20 Claims, 5 Drawing Sheets

| TYPE | PRIMARY/SELECTION | | | 1ST DEGRADATION/SELECTION | | | 2ND DEGRADATION/SELECTION | | |
|---|---|---|---|---|---|---|---|---|---|
| | BIT RATE | DELAY TIME | BER | BIT RATE | DELAY TIME | BER | BIT RATE | DELAY TIME | BER |
| AUDIO | 56 | 58 | B | 82 | 84 | 86 | 106 | 108 | 112 |
| | 64 | 66 | D | 88 | 92 | 94 | 114 | 116 | 118 |

FIG. 3

VIDEO CONFERENCE

| TYPE | PRIMARY/SELECTION | | | 1ST DEGRADATION | | | 2ND DEGRADATION | | |
|---|---|---|---|---|---|---|---|---|---|
| | BIT RATE | DELAY TIME | BER | BIT RATE | DELAY TIME | BER | BIT RATE | DELAY TIME | BER |
| AUDIO | 56-A 14.4 | A | B | 82-A 14.4 | A1 | B1 | 106-A 14.4 | A2 | B2 |
| | 64-A 14.4 | C | D | 88-A 14.4 | C1 | D1 | 114-A 14.4 | C2 | D2 |
| VIDEO | 56-V 384 | E | F | 82-V 144 | E1 | F1 | 106-V 0 | E2 | F2 |
| | 64-V 384 | G | H | 88-V 144 | G1 | H1 | 114-V 0 | G2 | H2 |
| DATA | 56-D 144 | I | J | 82-D 64 | I1 | J1 | 106-D 64 | I1 | J2 |
| | 64-D 144 | K | L | 88-D 64 | K1 | L1 | 114-D 64 | K2 | L2 |

FIG. 4

| TYPE 42 | PRIMARY SELECTION | | | 1ST DEGRADATION | | | WEB PAGE BROWSING 2ND DEGRADATION | | |
|---|---|---|---|---|---|---|---|---|---|
| | BIT RATE | DELAY TIME | BER | BIT RATE | DELAY TIME | BER | BIT RATE | DELAY TIME | BER |
| AUDIO 44 | 56-A 14.4 | 58-A A | B | 82-A 0 | 84-A A1 | B1 | 0 | A2 | B2 |
| | 64-A 0 | C 62-A | D | 0 | C1 86-A | D1 | 0 | C2 | D2 |
| VIDEO 152 | 56-V 128 | E | F | 0 | E1 | F1 | 0 | E2 | F2 |
| | 64-V 0 | G | H | 0 | G1 | H1 | 0 | G2 | H2 |
| DATA 154 | 56-D 128 | I | J | 28.8 | I1 | J1 | BE | I2 | J2 |
| | 64-D 9.6 | K | L | 9.6 | K1 | L1 | 9.6 | K2 | L2 |

FIG. 5

| TYPE 42 | PRIMARY SELECTION | | | 1ST DEGRADATION | | | VIDEO ON DEMAND 2ND DEGRADATION | | |
|---|---|---|---|---|---|---|---|---|---|
| | BIT RATE | DELAY TIME | BER | BIT RATE | DELAY TIME | BER | BIT RATE | DELAY TIME | BER |
| AUDIO 44 | 56 | A | B | 14.4 | A1 | B1 | 9.6 | A2 | B2 |
| | 64 | C | D | 0 | C1 | D1 | 0 | C2 | D2 |
| VIDEO 152 | 56-V 2048 | E | F | 384 | E1 | F1 | 144 | E2 | F2 |
| | 64-V 0 | G | H | 0 | G1 | H1 | 0 | G2 | H2 |
| DATA 154 | 56-D 9.6 | I | J | 9.6 | I1 | J1 | 9.6 | I2 | J2 |
| | 64-D 9.6 | K | L | 9.6 | K1 | L1 | 9.6 | K2 | L2 |

| TYPE | | PRIMARY SELECTION | | | 1ST DEGRADATION SELECTION | | | 2ND DEGRADATION SELECTION | | |
|------|------|----------|------------|-----|----------|------------|-----|----------|------------|-----|
| IMEI | AUDIO | BIT RATE | DELAY TIME | BER | BIT RATE | DELAY TIME | BER | BIT RATE | DELAY TIME | BER |
| | 1 | 56 | 58 | 62 | 82 | 84 | 86 | 106 | 108 | 112 |
| | | 64 | 66 | 68 | 88 | 92 | 94 | 114 | 116 | 118 |

APPARATUS, AND ASSOCIATED METHOD FOR CONTROLLING SERVICE DEGRADATION PERFORMANCE OF COMMUNICATION IN A RADIO COMMUNICATION SYSTEM

CROSS REFERENCE TO RELATED APPLICATIONS

The present application is a continuation-in-part of application Ser. No. 09/116.530 filed on Jul. 16, 1998.

The present invention relates generally to communication quality levels in a radio communication system, such as a cellular communication system. More particularly, the present invention relates to apparatus, and an associated method, for facilitating controlled degradation of a QoS (quality of service) level parameters during a communication session in the radio communication system if a desired QoS level parameter is unable to be maintained.

A storage register stores a service degradation profile. The service degradation profile includes an indication of one or more degraded QoS level parameters to be maintained in the event that a desired QoS level parameter is unable to be attained or maintained during a communication session. If the desired QoS level parameter of ongoing communication session is unable to be maintained, an attempt is made to effectuate or continue communication at a reduced-quality degraded QoS level parameter corresponding to a degraded QoS level parameter stored as part of the service degradation profile.

When implemented in a cellular communication system, the service degradation profile is associated with a communication service-type. If, during initiation of communications or during ongoing communications, such as when a hand off between base stations is attempted, communications at the desired QoS level parameter cannot be achieved, a degraded QoS level parameter stored as part of the service degradation profile is accessed. Communications with the mobile station at the degraded QoS level parameter is attempted. Service renegotiation with the mobile station is not required as the service degradation profile associated with the communication service is automatically accessed and communications are effectuated, if possible, at the degraded QoS level parameter. Thereby, system overhead, such as control signaling between the network and the mobile station, is reduced. When communication conditions require that the QoS level parameter of communications with the mobile station be reduced, the service degradation is implemented in a controlled and non-abrupt manner.

BACKGROUND OF THE INVENTION

A communication system permits the communication of information between a sending station and a receiving station and is formed, at a minimum, of a transmitter, located at the sending station, and a receiver, located at the receiving station, interconnected by a communication channel. Communication signals are formed of the information to be transmitted by the sending station. Communication signals are formed to be of characteristics to permit their transmission upon the communication channel. The receiving station is tuned to receive the communication signals transmitted upon the communication channel. Information contained in the communication signal transmitted upon the communication channel is recovered, once received at the receiving station.

A radio communication system is a communication system in which the communication channel upon which the communication signal is transmitted is formed of a radio channel defined upon a portion of the electromagnetic spectrum. Because a wire line connection is not required to form the communication channel between a sending and a receiving station, communications are possible when such a wire line connection between the sending and receiving station would be impractical.

A cellular communication system is exemplary of a radio communication system. Cellular communication systems, constructed according to various standards, have been installed throughout significant portions of the world. A subscriber to a cellular communication system is able to communicate therein by way of a mobile station when the mobile station is positioned within an area encompassed by the communication system. Telephonic communication of both voice information and data information is permitted in such networks.

Access to communication by way of the cellular communication system is permitted pursuant to a service subscription to which a subscriber subscribes. A unique identification number is associated with the service subscription. The identification number is used in authentication procedures to provide a mobile station, operable pursuant to the service subscription, access to the cellular network. The identification number is also used for billing purposes.

QoS (quality of service) level parameters can be defined to provide a standard by which to measure or ensure minimum communication quality levels. A QoS level parameter can be used in service initiation and service modification. A QoS level parameter defines a communication quality level in terms of, e.g., a data transmission rate, a bit error rate, or a signal delay amount upon a forward link and upon a reverse link. To ensure that appropriate communication quality levels are achieved during service initiation, the QoS level parameter must be met to ensure an appropriate level of communication quality, defined by the values of the parameters associated with the QoS level. However, the QoS level parameters might not be able to be achieved during a particular communication session. Such parameters may not be able to be achieved during service initiation during which the communication session is attempted to be initiated, or during the communication session, such as when a hand off is requested or otherwise attempted. The desired QoS level parameters may not be able to be attained or maintained due to lack of resources available for the communications during the communication session. If the desired QoS level parameters cannot be attained or maintained, there might be a service renegotiation between the network infrastructure and the mobile station which requires significant levels of control signaling between the mobile station and the network infrastructure and also within the network. Such control signaling is referred to as overhead as the signaling requires system resources without directly providing user communications. The existing requirement to provide service renegotiation when a desired QoS level parameter cannot be attained or maintained is therefore a disadvantageous use of the system resources. Alternately, if there is not a service renegotiation, there is a possibility that a noticeable and abrupt service degradation during a communication session might occur.

A manner by which to provide for a managed and non-abrupt service degradation of QoS level parameters during a communication session without requiring significant service renegotiation would therefore be advantageous.

It is in light of this background information related to quality of service level parameters of communications in a radio communication system that the significant improvements of the present invention have evolved.

SUMMARY OF THE INVENTION

The present invention, accordingly, advantageously provides apparatus, and an associated method, for facilitating controlled degradation of QoS level parameters of communications in a radio communication system, if communications at desired QoS level parameters are unable to be effectuated or maintained.

In one aspect of the present invention, a service degradation profile is stored in a storage register. The service degradation profile is associated with a communication service-type. That is to say, in one implementation, for each different communication service performable pursuant to operation of the communication system, a separate service degradation profile is defined. The service degradation profile includes one or more degraded QoS level parameters at which to attempt to effectuate or maintain communications of the communication service-type in the event that desired QoS level parameters cannot be achieved. If the desired QoS level parameters cannot be achieved, an attempt is made to perform the communication service at QoS level parameters corresponding to the degraded QoS level parameters stored as part of the service degradation profile. Thereby, in the event that the communication cannot be effectuated or maintained at a desired QoS level parameter, the communication shall be effectuated or continue at the degraded QoS level parameter without the need for control signaling with the mobile station and within the infrastructure to renegotiate service quality levels. Also, because the service degradation occurs pursuant to the prescribed service degradation profile, abrupt service degradation does not occur. Rather, the service degradation occurs pursuant to the parameters of the service degradation profile. And, because a common service degradation profile is defined for each type of communication service, the number of profiles required to be created, maintained, and accessed is limited to the number of communication service-types of which a communication session can be formed.

In one implementation, the service degradation profile is implemented in a cellular communication system, such as a cellular communication system conforming to the standards set forth in the IS-95 3G specification promulgated by the EIA/TIA. The service degradation profile is stored together with other subscriber profiles, such as at the HLR (home location register) associated with the mobile station. If communication cannot be effectuated or maintained at desired QoS level parameters, the service degradation profile is accessed, and communications are effectuated or maintained, if possible, at the degraded QoS level parameters stored as part of the service degradation profile. Service renegotiation with the mobile station is not required as the service degradation profile is automatically accessed. And, because the service degradation is implemented pursuant to a prescribed service degradation profile, abrupt service degradation of communications with the mobile station are less likely to occur.

In these and other aspects, therefore, apparatus, and an associated method, is provided for reducing a desired QoS (quality of service) level parameter of communications between a mobile station and a fixed network of a radio communication system. The fixed network includes a plurality of spaced-apart, fixed-site transceivers positioned throughout a geographic area. Each fixed-site transceiver defines a coverage area in which communications with a mobile station are permitted pursuant to a service subscription. The desired QoS level parameter is reduced to a selected degraded QoS level parameter when communications pursuant to at least a first communication service at the desired QoS level is unavailable. A service subscription register is associated with the at least the first communication service. The service subscription register stores an indication of at least a first selected degraded QoS level parameter at which the communication pursuant to the at least the first communication service are to be maintained if the continued communications at the desired QoS level parameter are unavailable. A resource availability determiner is coupled to receive information representative of at least the first selected degraded QoS level parameter when the communications at the desired QoS level parameter are unavailable. The resource availability determiner and service level selector selectively determines the availability of resources of the radio communication system and selects service levels to assure that the communications are available at least at the first degraded QoS level parameter.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
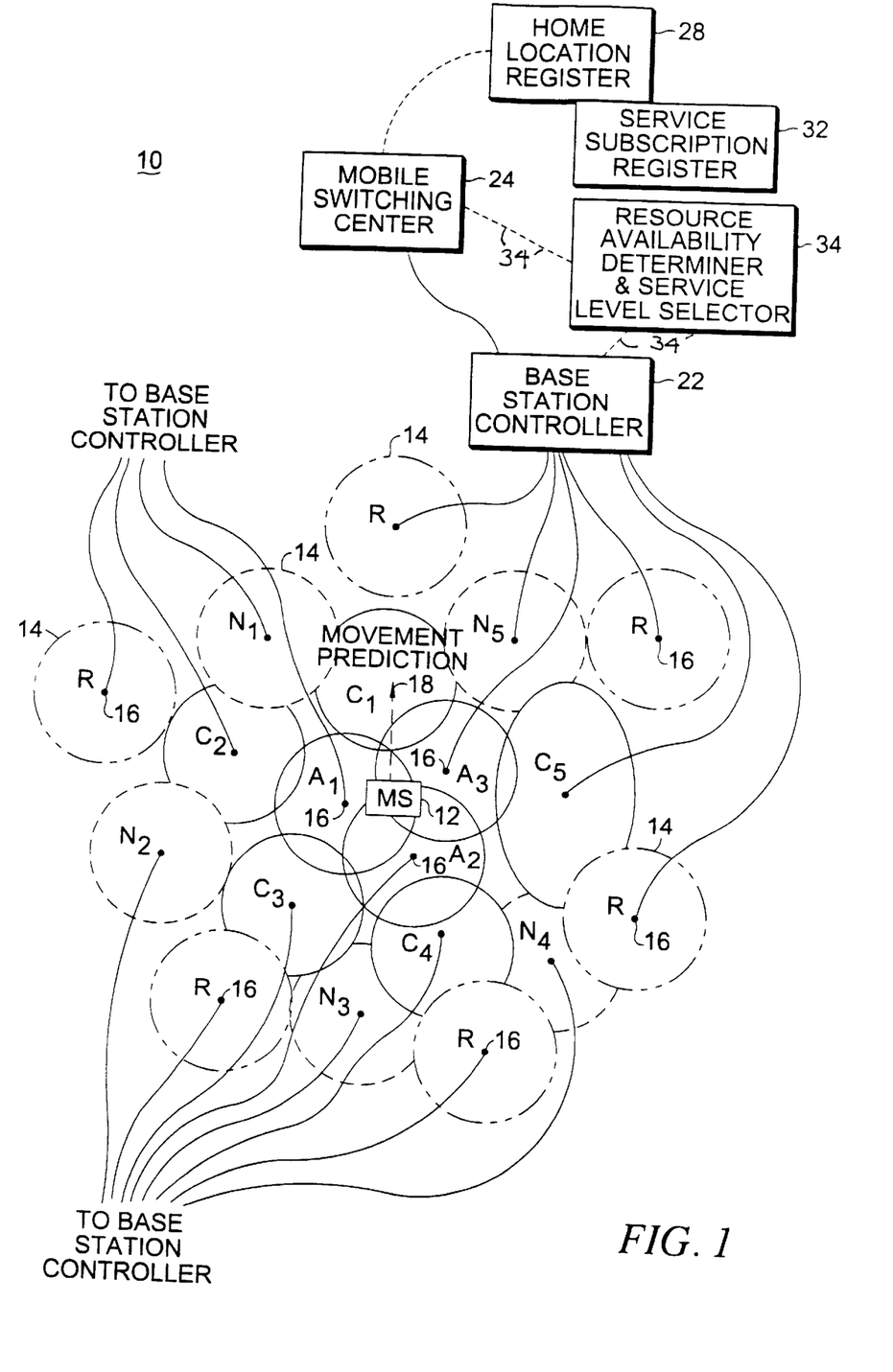
FIG. 1 illustrates a portion of a cellular communication system which includes an embodiment of the present invention as a portion thereof.

Referring first to FIG. 1, a portion of a cellular communication system, shown generally at 10, is installed throughout a geographical area. The cellular communication system 10 permits telephonic communications between network infrastructure of the communication system and mobile stations, of which the mobile station 12 is exemplary. In the exemplary embodiment illustrated in the Figure, the cellular communication system is constructed to comply with the standards set forth in the IS-95 3G specification promulgated by the EIA/TIA. Cellular communication systems, and other radio communication systems, can similarly be represented, and an embodiment of the present invention is analogously operable in such other communication systems.

A plurality of cells 14 are defined in the system 10. A radio base station 16 is associated with each of the cells 14. The radio base stations 16 are formed of fixed-site transceivers capable of two-way communications with a mobile station, such as the mobile station 12. A Communication signal transmitted by a base stations 16 to a mobile station is transmitted upon a channel referred to as a forward link, and a communication signal generated by the mobile station and transmitted to a radio base stations 16 is transmitted upon a communication channel referred to as a reverse link. The base stations 16 are positioned at spaced-apart locations throughout the geographical area encompassed by the communication system 10 in manners such that the two-way coverage areas by which the cells 14 are defined at least partially overlap with one another. For purposes of illustration, the base stations 16 are positioned at the centers of their associated cells 14. In actual implementations, other arrangements are possible. For instance, base stations utilizing sector antennas are sometimes utilized so that more than one base station may be co-located and cells associated with the base station are defined by the sectors of coverage of such sector antennas.

The base stations 16 are here shown further to be coupled to base station controllers, of which the base station controller (BSC) 22 is exemplary. Typically, several base stations are coupled to, and are controlled by, a single BSC. Each BSC is coupled to a mobile switching center (MSC), of which the MSC 24 is exemplary. A number of BSCs are typically coupled to a single MSC. An MSC, such as the MSC 24, is coupled to a public-switched telephonic network (not shown).

The mobile switching center 24 is here shown to include an HLR (home location register) 28. A portion of the HLR 28 forms a service subscription register 32.

Cellular communication systems make efficient use of the portion of the electromagnetic spectrum allocated for communications therein. Because of the spaced-apart nature of the base stations, the communication signals transmitted between the mobile station and a base station 16 located proximate thereto need only be of a relatively low power level. Because of transmission of the communications signals at such relatively low power levels, the same channels may be re-used at various cells of the system according to a channel allocation scheme. Thereby, a relatively large number of concurrent communications can be effectuated within a limited bandwidth allocation.

Advancements in communication techniques, particularly digital techniques, have permitted new types of radio communication services to be implemented and popularized. For instance, communication services including video conferencing, Internet web-browsing and video-on-demand services can all be provided. For example, such services are possible in a cellular communication system 10 constructed pursuant to the standards set forth in the IS-95 3G specification.

QoS level parameters set forth parameters associated with communication quality levels required for service initiation or modification of a communication session between a mobile station and the cellular network infrastructure. The QoS level parameters include, for example, data transmission rates, bit error rates of transmitted data, and signal delays for the forward and reverse links. While the QoS level parameters are of values intended to ensure an appropriate level of communication quality of communication signals transmitted between the mobile station and the network infrastructure, there is some possibility that not all of the QoS level parameters can be achieved for a particular communication session. Or, during a communication session, there is some possibility that the QoS level parameters cannot be maintained. For instance, when a mobile station travels between cells of the communication system, the QoS level parameters in a cell to which a hand over is to be effectuated may not be able to be attained. That is to say, the resources required to achieve such QoS level parameters might not be available for the communication session. In conventional implementations, termination of the communication session would result. And, proposals by which to renegotiate service with the mobile station, either over a radio interface with the mobile station or otherwise utilizing network resources, is costly in terms of increased overhead. Operation of an embodiment of the present invention provides a manner by which to avoid abrupt communication termination and to avoid the need for elaborate service renegotiation in the event that communication at desired QoS level parameters cannot be achieved.

The mobile station 12 is associated with an HLR, here the HLR 28. The HLR stores data, inter alia, forming a service degradation profile (SDP). During operation of an embodiment of the present invention, the data stored at the HLR forming the service degradation profile is selectively utilized to provide for controlled degradation of communication service performance when communication resources available for a communication session cannot assure that desired QoS level parameters can be achieved. As the service degradation profile is index against a communication service-type, all communication services of a particular type are governed by the same SDP. The base station controller 22 is here shown further to include a resource availability determiner and service level selector 34. The determiner and selector 34 forms a functional entity. Such portion of the base station controller, or a group of base station controllers, is operable to determine QoS level parameters of selected communication links of the communication system 10 and checks the resource availability of both the MSCs and BSCs when making such determinations. Lines 34' and 34" shown in dash, are representative of such checks. Responsive to the determinations, selective access is made to the service degradation profile 32 stored at the home location register 28.

Figure 2:
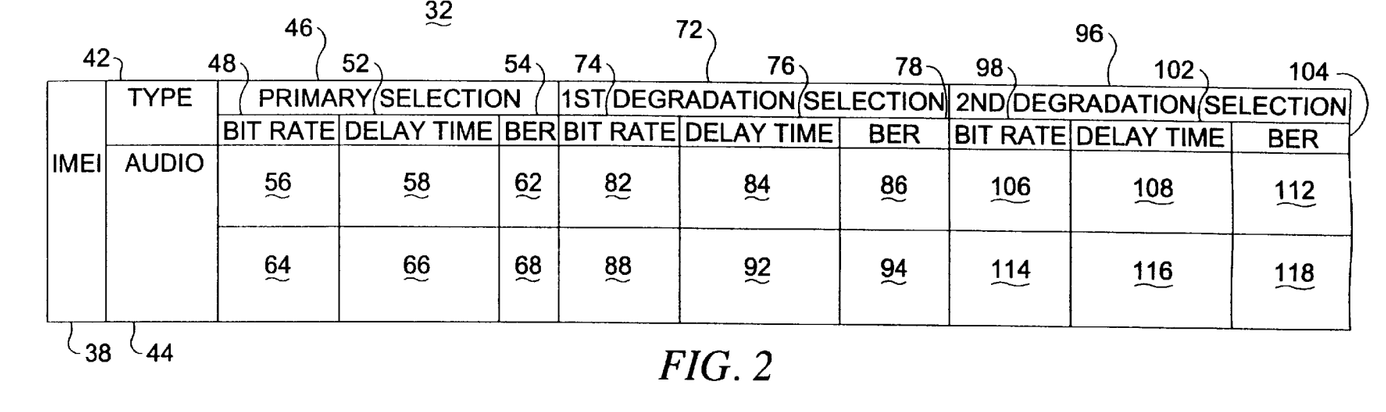
FIG. 2 illustrates a table listing an exemplary service degradation profile pursuant to which QoS level parameters are maintained during operation of the communication system shown in FIG. 1.

FIG. 2 illustrates a service degradation profile 32 of an embodiment of the present invention. The service degradation profile forms part of the subscription information associated with a service subscription for subscriber service to communicate in the cellular communication system 10 shown in FIG. 1. Here, the data forming the service degradation profile is indexed against a communication service-type identifier which identifies the type of communication service with which a service degradation profile is associated. In the Figure, the column 42 indicates the communication service-type associated with the service degradation profile and here the service-type is indicated to be an audio service 44.

A primary selection 46 of QoS level parameters is associated with the audio service. Here, the parameters include a bit rate selection 48, a delay time selection 52, and a BER (bit error rate) selection 54. Values of these parameters are indicated by values 56, 58, and 62, respectively, for forward link communications and by the values 64, 66, and 68 for reverse link communications. Viz., the upper row, containing the values 56, 58, and 62 define parameters for the forward traffic channel, and the values 64, 66, and 68 define parameters for the reverse traffic channel. Communications on the forward and reverse links are to meet or exceed such values for a selected quality level of communications.

The profile 42 further includes a set of first degradation QoS level parameters 72. Analogous to the set of parameters 46, the set of parameters 72 includes a bit rate selection 74, a delay time selection 76, and a BER selection 78. First degradation level values of such parameters for forward link communications, i.e., on the forward traffic channel, are indicated at 82, 84, and 86, respectively. And, first degradation parameter values for reverse link communications, i.e., on the reverse traffic channel, are indicated at 88, 92, and 94. The values of the first degradation QoS parameters set forth values which must be met or exceed to ensure quality of communications as least as good as a first degradation level. If communication quality levels corresponding to the primary QoS level parameters 46 cannot be ensured, communication is attempted to be effectuated, or maintained, at the first degraded level, indicated by the values of the parameters 72.

The profile 32 also includes a set of second degradation QoS level parameters 96. The set again includes a bit rate selection 98, a delay time selection 102, and a BER selection 104. Again, the values, here values 106, 108, and 112, respectively, are associated with the selections of the set of second degradation QoS level parameters for communications on the forward traffic channel. And, values 114, 116, and 118 identify corresponding values of the reverse link, i.e., on the reverse traffic channel. When communications cannot be effectuated or maintained at the quality of service level of the first degradation parameters, communications are attempted to be effectuated or maintained at the quality of service levels identified by the parameters of the set 96.

Because the service degradation profile 32 is stored at the home location register 28, the values contained in the profile are accessed automatically when the resource availability determiner and service level selector 34 (shown in FIG. 1) indicates that communication quality of service levels cannot be effectuated or maintained. Service renegotiation does not require significant system overhead, and communication sessions are better able to be effectuated and maintained.

Figure 3:
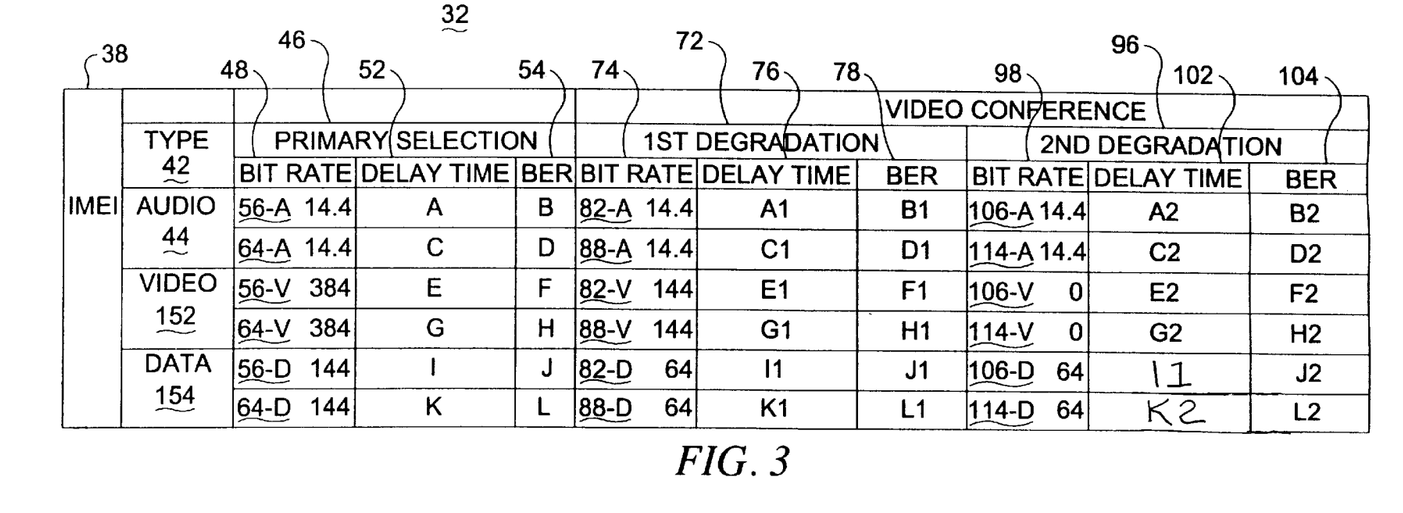
FIG. 3 illustrates a table, similar to that shown in FIG. 2, but here listing another exemplary service degradation profile pursuant to which QoS level parameters are maintained during operation of the cellular communication system shown in FIG. 1.

FIG. 3 illustrates another exemplary service degradation profile 32. Here, the profile pertains to a video conferencing service. The column 42 indicates the service-type which, for video conferencing, includes audio 44, video 152, and data 154. Again, a set of primary QoS level parameters 46, a set of first degradation QoS level parameters 72, and a set 96 of second degradation QoS level parameters form the service degradation profile. Additional steps of degradation QoS level parameters can further be provided. Bit rate, delay time, and BER selections 48–54, 74–78, and 98–104, form components of the respective set 46, 72, and 96 in analogous manner to that described with respect to the profile 32 of FIG. 2. The values of the selections of the various sets are referenced with the same reference designations as those used previously, but here also with the suffixes -A, -V, -D to indicate values of audio, video, and data for the various selections. And, for each of the sets, top rows pertain to forward traffic channels and bottom rows pertain to reverse traffic channels.

Again, communications are to be effectuated and maintained at the quality levels indicated by the values of the selections of the set of primary QoS level parameters 46 for each of the three communication-types 44, 152, and 154. If the determiner and selector 34 (shown in FIG. 1) determines that such values cannot be effectuated or maintained, default is made to the values of the selections of the first degradation set 72, and, thereafter, to the values of the set 96, if necessary. Thereby, system overhead for service renegotiation is reduced and abrupt termination of a communication session is less likely to occur.

Figure 4:
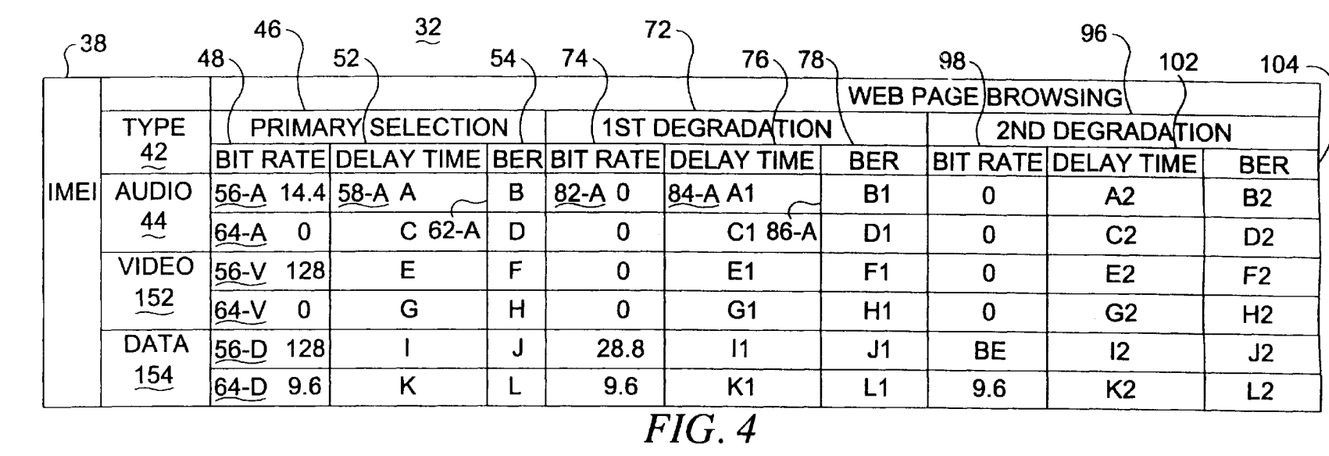
FIG. 4 illustrates another table, similar to those shown in FIGS. 2–3, but here illustrating another service degradation profile pursuant to which the QoS level parameters are maintained in a communication session during operation of the cellular communication system shown in FIG. 1.

FIG. 4 illustrates another service degradation profile 32. Here, the service degradation profile is for a web-page browsing service. The column 42 lists the communication-types of audio 44, video 152, and data 154. Sets 46, 72, and 96 again form portions of the profile 32. Selections 48–54, 74–78 and 98–104 form the values of the respective sets 46, 72, and 96. And, values for forward-link and reverse-link communications are commonly-referenced with the values of the preceding Figures, again including the suffixes -A, -V, and -D, to indicate the values for audio, video, and data communications. Again, for each of the sets, top rows pertain to forward traffic channels, and bottom rows pertain to reverse traffic channels. Access is made to the service degradation profile 32 in manner analogous to those described with respect to the profiles shown in FIGS. 2 and 3.

Figure 5:
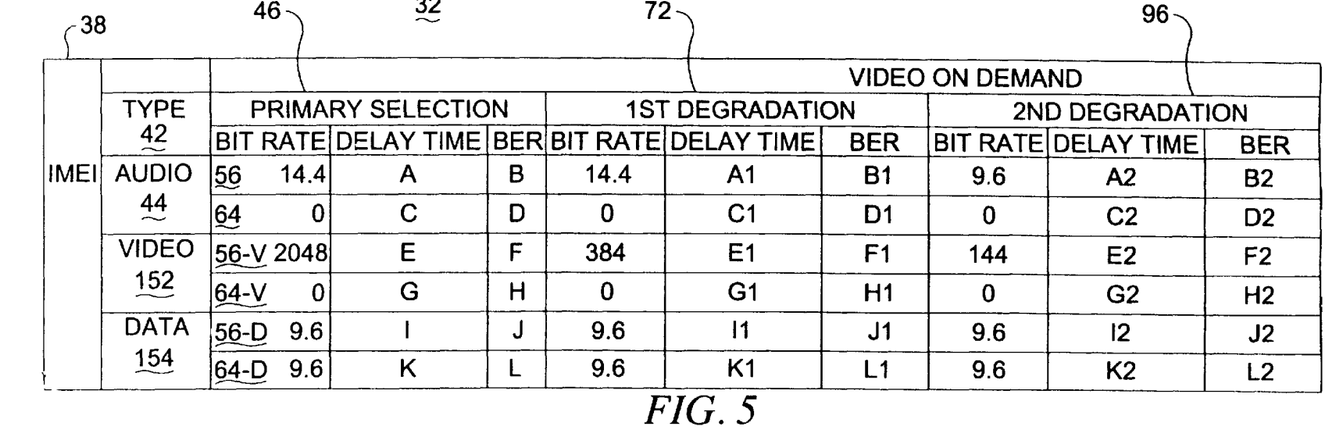
FIG. 5 illustrates another table, similar to those shown in FIGS. 2–4, but here showing another service degradation profile of QoS level parameters pursuant to which communication levels are maintained during a communication session of the cellular communication system shown in FIG. 1.

FIG. 5 illustrates another exemplary service degradation profile 32. Here, the profile is for a video-on-demand (VOD) service. The column 42 again indicates communication-types of audio 44, video 152, and data 154. And, the profile 32 includes primary, first degradation, and second degradation QoS level parameters 48, 72, and 102, respectively. And, selections 48–54, 74–78, and 98–104 are associated with such sets 48, 72, and 102, respectively. Again, values of the selections are commonly-referenced with those shown in the profile shown in FIGS. 2–4, again with the suffixes -A, -V, and -D, for audio, video, and data communications. And, again, top rows of the sets pertain to forward traffic channels and bottom rows of the sets pertain to reverse traffic channels. Access to the profile 32 is made by the determiner and selector 34 (shown in FIG. 1) in manners as described previously, thereby to reduce the need for service renegotiation and reduce the possibility that video-on-demand sessions shall be abruptly terminated.

Figure 6:
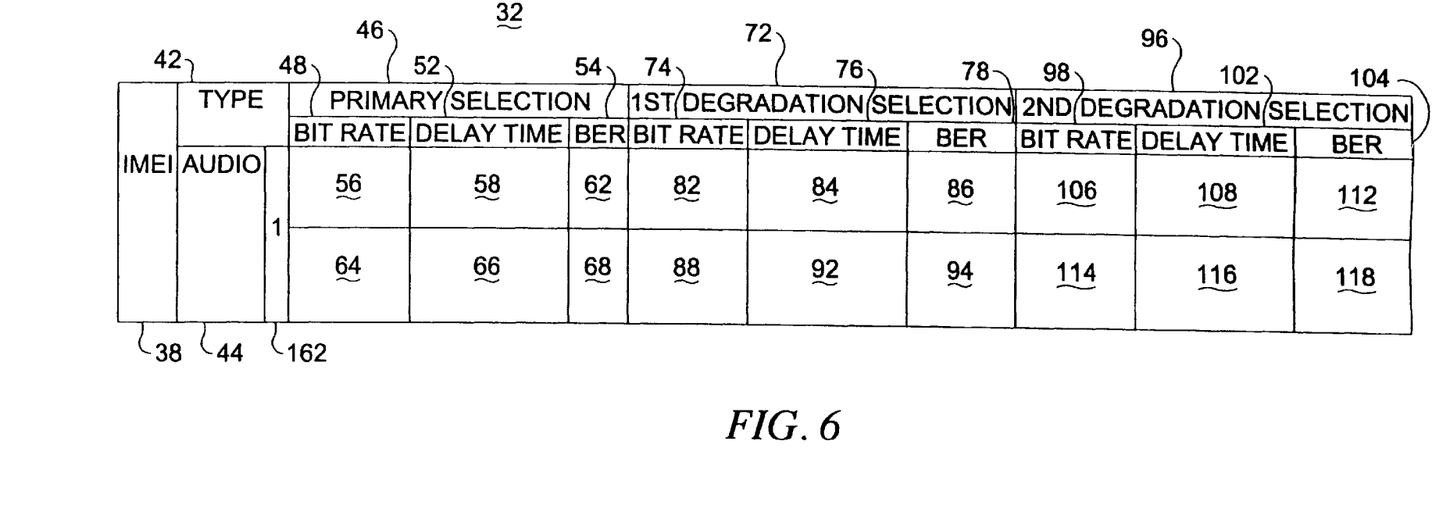
FIG. 6 illustrates another table similar to that shown in FIGS. 2–5, but here showing the service degradation profile which also has a priority level associated therewith, used during resource contention to determine allocation of resources between competing mobile stations.

FIG. 6 illustrates another exemplary service degradation profile 32. Here, analogous to the profile shown in FIG. 2, the service degradation profile shown in FIG. 6 the service provides at least for audio communications. The service degradation profile is associated with a communication service-type performable in a cellular communication system, such as the system 10 shown in FIG. 1. Again, the data forming the service degradation profile is indexed against the type of communication service. Column 42 indicates the service-type, here, an audio subscription 44.

The service degradation profile 32 shown in FIG. 6 further includes a priority level 162 associated with the audio service. The priority level, thereby, is also a permanent record which is stored in the HLR 28 (shown in FIG. 1) together with other portions of the profile 32, as a default priority level for the service-type. When service subscription is permitted for more than one type of service, a separate priority level is associated with each service. For instance, audio service, web page browsing service, and video-on-demand service, all might be available in the communication system. A separate priority level is associated with each of such three service-types.

The priority level defines a priority-of-access representing the priority to be given to the mobile station operable to effectuate the communication service to communicate in the radio communication system pursuant to the service-type. When resources are limited and separate mobile stations contend for the limited resources, the priority level associated with the communication service is used to allocate the system resources to the mobile station having the higher priority level associated therewith.

The priority level 162 defines a default priority for the audio service-type of the profile shown in FIG. 6. The default priority can be overwritten on a per-call basis by a user during service initialization, either for a mobile-originated or a mobile-terminated call by way of L3 signaling. That is to say, a priority parameter can be entered to overwrite the default priority. A mobile-terminated call uses the default priority level, such as the level 162, together with an option for the subscriber to change the priority upon receipt of the call at the mobile station. The priority parameter used to overwrite the default priority is maintained by the system until the call is terminated.

Resource contention procedures are instituted, for instance, when competing subscribers simultaneously request limited resources during service initialization or when service modifications require that additional resources be allocated to a communication session. Resource contention also occurs when a handover is to be effectuated to a new cell at which new resources need to be allocated to the communication session. Also, resource contention procedures are required when a subscriber, that has been downgraded, and before service is upgraded through a previously-requested service level subsequent to renewed availability of the resources. For example, if a subscriber requests audio-only service with the highest priority, resources will be allocated to such subscriber before another subscriber is granted resources with a lower priority. The unfulfilled service is downgraded based upon the parameters of the service degradation profile. In another exemplary implementation, QoS prioritization occurs when, even when the system is operated at full capacity, an emergency call is made. An emergency call, given a highest priority, will cause a lowest-priority call to be dropped to ensure that the emergency call is effectuated.

Remaining portions of the service degradation profile 32 shown in FIG. 6 correspond to commonly-referenced portions of the profile 32 shown in FIG. 2. Description of such other portions of the profile 32 is as above-described.

Figure 7:
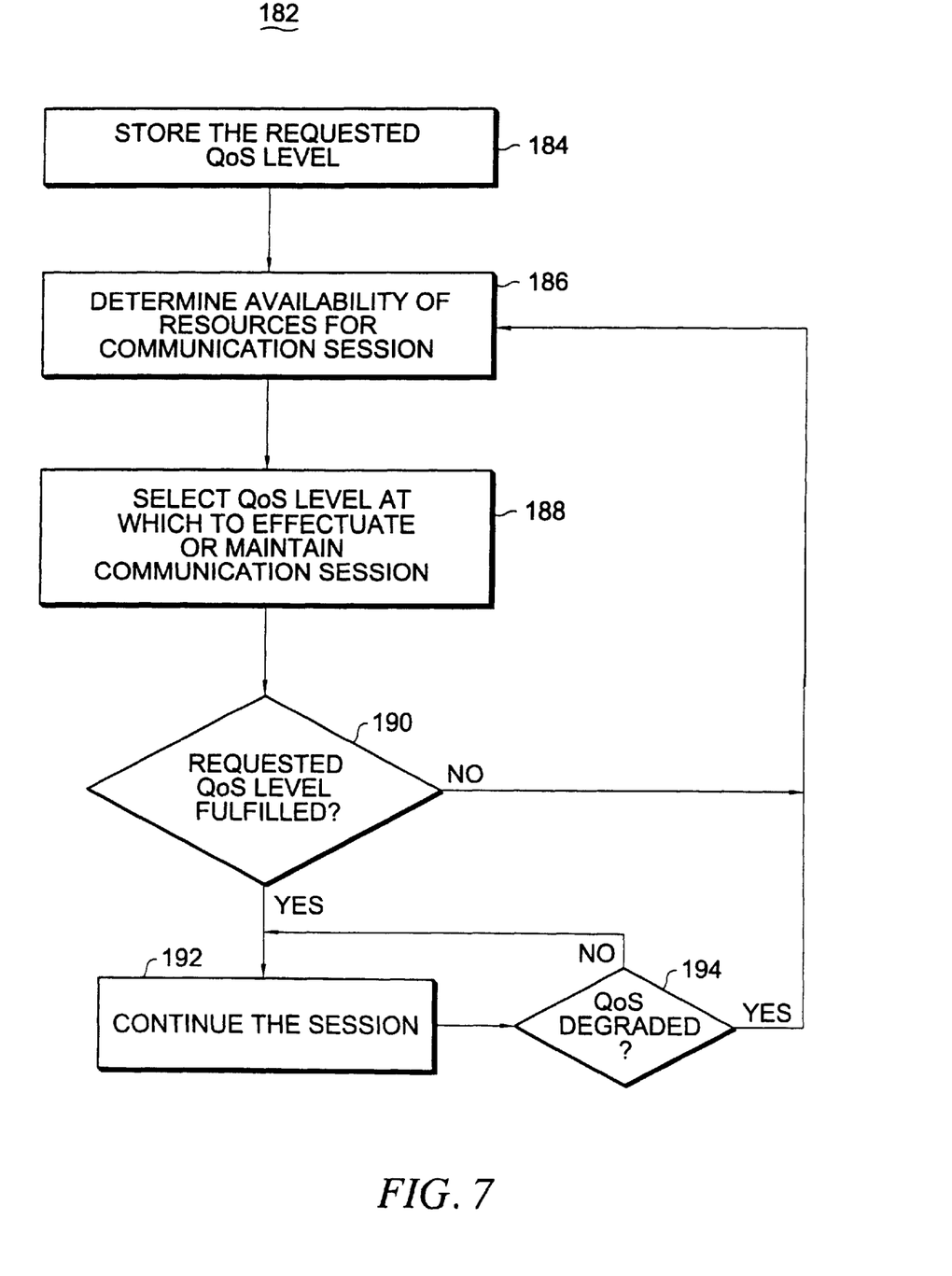
FIG. 7 illustrates a method flow diagram listing the method steps of the method of operation of an embodiment of the present invention.

FIG. 7 illustrates a method, shown generally at 182, of the method of an embodiment of the present invention. The method reduces a desired QoS (quality of service) level of communications between a mobile station and a fixed network of the radio communication system. The reduction is to at least a first selected degraded QoS level when continued communication pursuant to at least a first communication service at the desired QoS level is unavailable. The desired QoS level and the at least the first degraded QoS level together define a service degradation profile, common to all communications of a particular communication service-type. First, and as indicated by the block 184, an indication of at least a requested QoS level is stored. Alternately, a default QoS level indicated in the SDP profile can instead be stored. The stored level is a level at which communication pursuant to the at least the first communication service are to be maintained, if possible. Then, and as indicated by the block 186, a determination is made of the resources available for a communication session. Then, and as indicated by the block 188, selection is made of a QoS level at which to effectuate or maintain a communication session. When a selection is made, the values of the service degradation profile are accessed. If the QoS level is not fulfilled, the system periodically accesses the availability of the resources, and, once the resources become available, the system grants the requested QoS level to the mobile station. Thereafter, a determination is made at the decision block 190 as to whether the requested QoS level has been fulfilled. If not, the no branch is taken back to block 186. Otherwise, if the QoS level has been fulfilled, the yes branch is taken to block 192, and the communication session is continued. A determination is then made at the decision block as to whether there has subsequently been degradation of the QoS level of communications. If not, the no branch is taken back to the block 192; otherwise the yes branch is taken back to the block 186.

Through operation of an embodiment of the present invention, system overhead required for service renegotiation when parameters of a desired QoS level cannot be attained or maintained is reduced. Also, because service degradation is effectuated pursuant to a service degradation profile, abrupt termination of a communication session is less likely to occur if the parameters of the desired QoS level cannot be assured.

The previous descriptions are of preferred examples for implementing the invention, and the scope of the invention should not necessarily be limited by this description. The scope of the present invention is defined by the following claims.

We claim:

1. In a radio communication system having a fixed network including a plurality of spaced-apart, fixed-site transceivers positioned throughout a geographic area, each fixed-site transceiver defining a coverage area in which communications with a mobile station are permitted pursuant to a service subscription, a combination with the fixed network of apparatus for reducing a desired QoS (quality of service) level of communications between the mobile station and the fixed network to a selected degraded QoS level when continued communications pursuant to at least a first communication service at the desired QoS level is unavailable, said apparatus comprising:

a service subscription register associated with the at least the first communication service, said service subscription register for storing an indication of at least a first selected degraded QoS level at which the communications pursuant to the at least the first communication service are to be maintained if the continued communications at the desired QoS level are unable to be maintained; and a resource availability determiner and service level selector coupled to receive information representative of the at least the first selected degraded QoS level when the communications are unavailable at the desired QoS level, said resource reserver for selectively reserving resources of the radio communication system to assure that the communications are able to continue pursuant to the at least the first degraded QoS level.

2. The apparatus of claim 1 wherein the at least the first selected degraded QoS level stored at said service subscription register comprises the first selected degraded QoS level and at least a second selected degraded QoS level, the second selected degraded QoS level at which the communications pursuant to the at least the first communication service are to be maintained if the continued communications at the desired QoS level and the first selected degraded QoS level are unable to be maintained.

3. The apparatus of claim 2 wherein said resource availability determiner and service level selector selectively reserves resources of the radio communication system to assure that the communications are able to continue pursuant to the at least the second degraded QoS level when the continued communications are unable to be maintained at the first selected degraded QoS level.

4. The apparatus of claim 1 wherein the at least the first selected degraded QoS level comprises a first selected forward-link degraded QoS level and a first selected reverse-link degraded QoS level.

5. The apparatus of claim 1 wherein the at least the first communication service comprises the first communication service and at least a second communication service and wherein the first selected degraded QoS level of which the indication thereof is stored by said service subscription register comprises a first selected first-communication-service degraded QoS level at which the communications pursuant to the first communication service are to be maintained and a first selected second-communication-service degraded QoS level at which the communications pursuant to the second communication service are to be maintained.

6. The apparatus of claim 1 wherein the at least the first communication service comprises a video conference service and wherein the first selected degraded QoS level of which the indication thereof is stored at said service subscription register comprises a first selected video-conference-service degraded QoS level.

7. The apparatus of claim 6 wherein the first selected video-conference-service degraded QoS level comprises a first selected degraded data QoS level.

8. The apparatus of claim 6 wherein the first selected video-conference-service degraded QoS level comprises a first selected degraded video QoS level.

9. The apparatus of claim 6 wherein the first selected video-conference-service degraded QoS level comprises a first selected degraded audio QoS level.

10. The apparatus of claim 1 wherein the at least the first communication service comprises a web browsing service and wherein the first selected degraded QoS level of which the indication thereof is stored at said service subscription register comprises a first selected web-browser service degraded QoS level.

11. The apparatus of claim 10 wherein the first selected web-browser-service degraded QoS level comprises a first selected degraded data QoS level.

12. The apparatus of claim 10 wherein the first selected web-browser-service degraded QoS level comprises a first selected degraded audio QoS level.

13. The apparatus of claim 10 wherein the first selected web-browser-service degraded QoS level comprises a first selected degraded video QoS level.

14. The apparatus of claim 1 wherein the at least the first communication service comprises a video on demand service and wherein the first selected degraded QoS level of which the indication thereof is stored at said service subscription register comprises a first selected video-on-demand service degraded QoS level.

15. The apparatus of claim 1 wherein said service subscription register further stores a priority level associated with the at least the first communication service, each priority level identifying a priority-of-access representing priority to be given to communicate in the radio communication system pursuant to the at least the first communication service.

16. The apparatus of claim 15 wherein the priority level stored at said service subscription register comprises a default priority level, a substitute priority level selectable at least during service initiation by the mobile station.

17. The apparatus of claim 1 wherein the radio communication system includes a first mobile station with which communications are permitted pursuant to a first service subscription and at least a second mobile station with which communications are permitted pursuant to at least a second service subscription, wherein a first service subscription register is associated with the first service subscription and a second service subscription register is associated with the second service subscription, said first service subscription register for storing an indication of the first degraded QoS level at which communications pursuant to the first communication service are to be maintained and a first priority level associated therewith, and said second service subscription register for storing an indication of the first degraded QoS level at which communications pursuant to the first communication service are to be maintained and a second priority level associated therewith.

18. The apparatus of claim 17 wherein said resource availability determiner and service level selector further compares the first priority level and the second priority level when communication pursuant to the first service subscription and pursuant to the second service subscription contend for common resources, results of comparisons by said resource availability determiner and service level selector determinative of which of the first mobile station and the second mobile station is given priority of access to the common resources.

19. A method for reducing a desired QoS (quality of service) level of communications between a mobile station and a fixed network of a radio communication system, the communications effectuated pursuant to a selected communication service of at least a first communication service type, to a selected degraded QoS level when communication pursuant to the at least the first communication service at the desired QoS level is unavailable, said method comprising the steps of:

storing an indication of at least a first selected degraded QoS level at which the communications pursuant to the at least the first communication service are to be maintained if the communications at the desired QoS level are unable to be maintained;

determining availability of resources for the communication pursuant to the first communication service at the desired QoS level; and selecting the communication at the first selected degraded QoS level if a determination is made during said step of determining that the communication at the desired QoS level is unavailable.

20. In a cellular communication system having a network infrastructure installed in a geographic region and mobile stations capable of communication with the network infrastructure pursuant to at least a first communication service, when located in the geographic region, a combination with the network infrastructure of a storage device for storing SDP (service degradation performance) data, said storage device comprising:

a communication service identifier portion for storing communication service identification indicia which identifies the at least the first communication service;

an SDP data storage portion having locations indexed together with the communication service identification indicia stored at said communication service identifier portion, each location of said SDP data storage portion for storing an indication of at least a first degraded QoS level at which communications are to be maintained between the network infrastructure and the mobile station to which the location of said SDP data storage portion is indexed together pursuant to a selected one of the at least the first communication service if the communications are unable at a desired QoS level.

* * * * *